United States Patent
Bishop et al.

(10) Patent No.: US 12,052,571 B2
(45) Date of Patent: Jul. 30, 2024

(54) RADIO FREQUENCY THREAT DETECTION

(71) Applicant: Cogitari, Inc., Vienna, VA (US)

(72) Inventors: Michael David Bishop, Spring Hill, TN (US); Gerhardus Hermanus Heerink, Vienna, VA (US)

(73) Assignee: Cogitari, Inc., Vienna, VA (US)

( * ) Notice: Subject to any disclaimer, the term of this patent is extended or adjusted under 35 U.S.C. 154(b) by 0 days.

(21) Appl. No.: 18/200,548

(22) Filed: May 22, 2023

(65) Prior Publication Data
US 2023/0300617 A1     Sep. 21, 2023

Related U.S. Application Data

(63) Continuation of application No. 17/027,227, filed on Sep. 21, 2020, now Pat. No. 11,700,530.

(51) Int. Cl.
| | |
|---|---|
| *H04L 9/32* | (2006.01) |
| *H04B 7/0413* | (2017.01) |
| *H04B 10/2575* | (2013.01) |
| *H04B 10/66* | (2013.01) |
| *H04W 12/08* | (2021.01) |
| *H04W 12/121* | (2021.01) |

(52) U.S. Cl.
CPC ........ *H04W 12/121* (2021.01); *H04B 7/0413* (2013.01); *H04B 10/25752* (2013.01); *H04B 10/66* (2013.01); *H04L 9/3247* (2013.01); *H04W 12/08* (2013.01)

(58) Field of Classification Search
CPC .............. H04W 12/121; H04W 12/08; H04W 12/122; H04B 7/0413; H04B 10/25752; H04B 10/66; H04L 9/3247; H04L 63/1408
See application file for complete search history.

(56) References Cited

U.S. PATENT DOCUMENTS

| | | | |
|---|---|---|---|
| 2005/0213755 A1* | 9/2005 | Daniels | H04W 12/122 380/38 |
| 2021/0281582 A1* | 9/2021 | Akella | H04W 12/06 |

* cited by examiner

*Primary Examiner* — Brian F Shaw
(74) *Attorney, Agent, or Firm* — Loppnow & Chapa; Matthew C. Loppnow

(57) ABSTRACT

An analog signal can be received. The analog signal can preserve native RF characteristics of a device RF signal received from a wireless device operating in a closed environment. An analog signature of the wireless device can be generated based on the native RF characteristics of the device RF signal. A digital signature of the wireless device can be generated based on information of network packets received from the wireless device. The analog signature and the digital signature can be correlated with characteristics of each known device of a plurality of known devices. The wireless device can be determined to be an unauthorized device based on correlating the analog signature and the digital signature with the characteristics of each known device.

20 Claims, 7 Drawing Sheets

RADIO FREQUENCY THREAT DETECTION

CROSS-REFERENCE TO RELATED APPLICATION

NA

BACKGROUND OF THE DISCLOSURE

1. Field of the Disclosure

The disclosure relates in general to threat detection, and more particularly, to radio frequency threat detection.

2. Background Art

Wireless communications have transformed society, allowing individuals, businesses, governments, etc., the convenience of data access wherever a wireless network is available. However, such wireless networks must be secure to avoid unauthorized entities from using these wireless networks for unauthorized reasons. These wireless networks are typically secured using a variety of security technologies, including encrypting the communications therein. However, wireless networks, even using encryption technologies, are still vulnerable to a variety of security attacks, such as evil twin attacks, malicious association, Media Access Control (MAC) spoofing, man-in-the-middle attacks, Denial-of-Service (DoS) attacks, network injection, Caffe Latte attacks, etc. Thus, with the benefits of wireless communications to society comes numerous security risks.

BRIEF DESCRIPTION OF THE DRAWINGS

The disclosure will now be described with reference to the drawings wherein.

DETAILED DESCRIPTION OF THE DISCLOSURE

Figure 1:
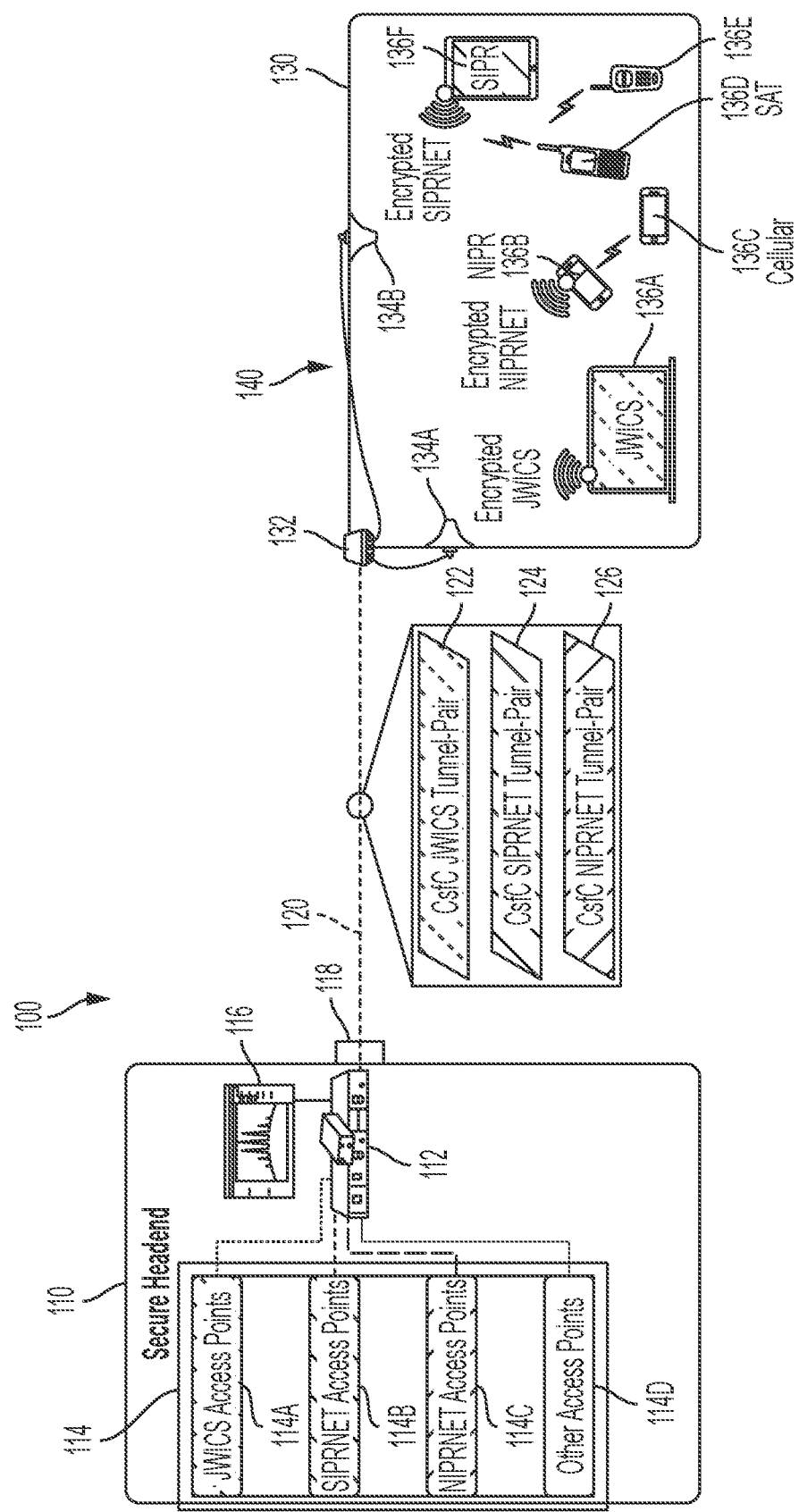
FIG. 1 illustrates an example system for securing a wireless environment, in accordance with at least one embodiment disclosed herein.

Some embodiments of the disclosure are directed to a method that can comprise receiving, via a fiber optic cable, an analog fiber optic signal that preserves native radio frequency (RF) energy characteristics of at least one first RF signal associated with at least one wireless device, and converting, by a light-to-RF converter, the received analog fiber optic signal into at least one second RF signal. The method can further comprise analyzing, by a processor, the at least one second RF signal and generating, by the processor, at least one digital signature associated with the at least one wireless device, respectively, based on the analysis of the at least one second RF signal. The method can yet further comprise determining, by the processor, if the at least one wireless device associated with the at least one digital signature, respectively, is one of an authorized device and an unauthorized device.

In some configurations, the method can further comprise receiving, by a single-input single-output (SISO) antenna system, the at least one RF signal, converting, by an RF-to-light converter, the at least one RF signal into the analog fiber optic signal, and communicating, by the fiber optic cable, the analog fiber optic signal.

In some configurations, the method can further comprise receiving, by a plurality of frequency-dependent spaced antennas, the at least one RF signal, converting, by a plurality of RF-to-light converters, the at least one RF signal into the analog fiber optic signal, and communicating, by the fiber optic cable, the analog fiber optic signal.

In some configurations, a multiple-input multiple-output (MIMO) distributed antenna system (DAS) can include the plurality of frequency-dependent spaced antennas of the method.

In some configurations, the method can further comprise spacing the plurality of frequency-dependent spaced antennas approximately 20 m apart.

In some configurations, the method can further comprise comparing, by the processor, signal strengths of the at least one RF signal received by the plurality of frequency-dependent spaced antennas to determine at least one of a coarse location of the at least one wireless device and a direction of the at least one wireless device.

In some configurations, the RF-to-light converter and the light-to-RF converter of the method can be part number A03-TLFCW-D31-DWS-S and part number A03-J4DW6-AD-M-Q, respectively, both by Optical Zonu Corporation.

In some configurations, the plurality of frequency-dependent spaced antennas can support at least one wireless network including at least one of Non-Secure Internet Protocol Router Network (NIPRNet), Secret Internet Protocol Router Network (SIPRNet), Joint Worldwide Intelligence Communications System (JWICS), and Common Work Environment (CWE).

In some configurations, the at least one first RF signal of the method can include at least one of a Wi-Fi signal, a Cellular signal, and a Bluetooth signal.

In some configurations, the at least one wireless device can be at least one of a cellular phone, a smart device, a tablet computer, a handheld radio, a drone, and a laptop computer.

In some configurations, the method can further comprise analyzing, by the processor, device-specific and port-specific network protocol message packets to generate the at least one digital signature, uniquely characterizing, by the processor, messages sent and received by the at least one wireless device designated as an authenticated, authorized network device, and cataloguing, indexing, and correlating, by the processor, the at least one digital signature with at least one analog signature, respectively.

In some configurations, the at least one analog signature can be generated, by the processor, based on at least one of a signal power level as measured by at least one receiving antenna array element, signal waveform data, and signal timing data, each associated with the at least one wireless device.

In some configurations, the method can further comprise continuously comparing, by the processor, signal characteristics of a modulated signal for the at least one wireless device and the at least one second RF signal to calculate a degree of statistical correlation and a probability of a match between the modulated signal for the at least one wireless device and the at least one second RF signal.

The disclosure is also directed to a system that can be comprised of a fiber optic cable, an optical-to-Radio Frequency (RF) converter, and a processor. The fiber optic cable can receive an analog fiber optic signal that preserves native radio frequency (RF) energy characteristics of at least one first RF signal associated with at least one wireless device. The light-to-RF converter can convert the received analog fiber optic signal into at least one second RF signal. The processor can analyze the at least one second RF signal, generate at least one digital signature associated with the at least one wireless device, respectively, based on the analysis of the at least one second RF signal, and determine if the at least one wireless device associated with the at least one digital signature, respectively, is one of an authorized device and an unauthorized device.

In some configurations, the system can be further comprised of a single-input single-output (SISO) antenna system and an RF-to-light converter. The SISO antenna system can receive the at least one RF signal and the RF-to-light converter can convert the at least one RF signal into the analog fiber optic signal, with the fiber optic cable communicating the analog fiber optic signal.

In some configurations, the system can be further comprised of a plurality of frequency-dependent spaced antennas and a plurality of RF-to-light converters. The single-input single-output (SISO) antenna system can receive the at least one RF signal. The plurality of RF-to-light converters can convert the at least one RF signal into the analog fiber optic signal, with the fiber optic cable communicating the analog fiber optic signal.

In some configurations, a multiple-input multiple-output (MIMO) distributed antenna system (DAS) can include the plurality of frequency-dependent spaced antennas of the system.

In some configurations, the plurality of frequency-dependent spaced antennas of the system can be spaced approximately 20 m apart.

In some configurations, the processor can further compare signal strengths of the at least one RF signal received by the plurality of frequency-dependent spaced antennas to determine at least one of a coarse location of the at least one wireless device and a direction of the at least one wireless device.

In some configurations, the RF-to-light converter and the light-to-RF converter of the system can be part number A03-TLFCW-D31-DWS-S and part number A03-J4DW6-AD-M-Q, respectively, both by Optical Zonu Corporation.

In some configurations, the plurality of frequency-dependent spaced antennas can support at least one wireless network including at least one of Non-Secure Internet Protocol Router Network (NIPRNet), Secret Internet Protocol Router Network (SIPRNet), Joint Worldwide Intelligence Communications System (JWICS), and Common Work Environment (CWE).

In some configurations, the at least one first RF signal of the system can be at least one of a Wi-Fi signal, a Cellular signal, and a Bluetooth signal.

In some configurations, the at least one wireless device of the system can be one of a cellular phone, a smart device, a tablet computer, a handheld radio, a drone, and a laptop computer.

In some configurations, the processor can further analyze device-specific and port-specific network protocol message packets to generate the at least one digital signature, uniquely characterize messages sent and received by the at least one wireless device designated as an authenticated, authorized network device, and catalogue, index, and correlate the at least one digital signature with at least one analog signature, respectively.

In some configurations, the at least one analog signature can be generated based on at least one of a signal power level as measured by at least one receiving antenna array element, signal waveform data, and signal timing data, each associated with the at least one wireless device.

In some configurations, the processor can further continuously compare signal characteristics of a modulated signal for the at least one wireless device and the at least one second RF signal to calculate a degree of statistical correlation and a probability of a match between the modulated signal for the at least one wireless device and the at least one second RF signal.

While this disclosure is susceptible of embodiment(s) in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, at least one embodiment is disclosed that includes a system, such as a Secure Mobility Architecture (SMA) 100. The SMA 100 can be comprised of a secure headend 110, e.g., in a "comms" room, that is coupled to a wireless environment 130 via a Radio Frequency over Fiber (RFoF) fiber optic cable 120, such as a Single-Mode Fiber (SMF) optic cable. The secure headend 110 can include an RF threat detector 112. The fiber optic cable 120 transports all signal to and from the RF threat detector 112 and wireless devices 136A/136B/136C/136D/136E/136F within a service area, such as the wireless environment 130 in which antennas 134A/134B can be disposed. The fiber optic cable 120 can receive analog fiber optic signals that preserve native RF energy characteristics of at least one RF signal associated with at least one wireless device, such as the wireless devices 136A/136B/136C/136D/136E/136F, respectively. The wireless devices 136A/136B/136C/136D/136E/136F can be at least one of agency-administered cellular phones, smart devices, tablets, handheld radios (e.g., by emergency personnel), a drone, laptop computers, and/or any other device that sends and receives RF signals. The fiber optic cable 120 can transport secure wireless network traffic from the wireless environment 130 as light between the secure headend 110 and the wireless environment 130. In at least one embodiment, the fiber optic cable 120 can be a battle-proven cable, such as that manufactured by Optical Cable Company. For example, the fiber optic cable 120 can be lightweight spools of rubberized fiber optic and hybrid fiber optic cable that allow for fast placement of the antennas 134A/134B. In at least one embodiment, the antennas 134A/134B can form a Distributed Antenna System (DAS) 140. In at least one embodiment, the antennas 134A/134B can be a self-contained unit packaged within a commercial-off-the-shelf (COTS) weatherproof, rugged case. In at least one embodiment, components of the DAS 140 can be designed for easy transport, emplacement, and recovery, such as for in a battlefield setting.

In at least one embodiment, the DAS 140 can be configured exclusively for RF monitoring instead of monitoring and wireless network services, which significantly increases the sensitivity of RF monitoring of the wireless environment 130. Once physically installed, all components of the wireless environment, such as the DAS 140, are configurable and "electronically relocatable" from the secure headend 110. The secure headend 110 can serve as a consolidated multi-domain monitor, AP/zone controller, logger, signal analyzer, and network configuration manager, balancer, and perform advanced security functions, such as for Technical Surveillance Counter-Measures (TSCM) and/or SIGnals INTelligence (SIGINT). The secure headend 110 can serve as an insertion point for TSCM and SIGINT assets that may then be electronically positioned anywhere within a mission space. This obviates the need to physically move receivers or signal processing equipment, such as the RF threat detector 112, into targeted/mission spaces.

The SMA 100 can use full-duplex radio concepts disclosed herein to remove authorized signals from the wireless environment 130, allowing discovery of unknown (potentially adversarial) wireless devices hiding within the wireless environment 130, as discussed in more detail below. The SMA 100 can monitor the entire wireless environment 130 using a single instance of collocated high-value monitoring equipment (SIGINT, TSCM) at the secure headend 110, such as the RF threat detector 112. As discussed in more detail below, the SMA 100 can electronically (as opposed to physically) reposition monitoring equipment, such as the RF threat detector 112. Such electronic repositioning can reduce costs and/or mitigates risk of tipping off adversaries of pending scans/sweeps when TSCM equipment and/or teams are emplaced. The SMA 100 can include an ability to bring SIGINT capabilities to bear against a wide band—e.g. 20 MHz to 40 GHz (with appropriate antennas) that goes far beyond the typical limits of commercial Wireless Intrusion Detection Systems (WIDS). For example, in at least one embodiment at least one of the wireless devices 136A/136B/136C/136D/136E/136F can be a low-power Bluetooth device and the SMA 100 can detect presence of this low-power Bluetooth device. In at least one embodiment with appropriate cyber safeguards guards in place, health and status of the RF components within the SMA 100 can be monitored remotely from a third-party location (not shown). Beyond reducing costs of network maintenance, this remote access can provide a means of remotely accessing spectrum log files and network logs useful to TSCM and/or cyber security operations.

The SMA 100 can analyze a combined output of commercial WIDS and RF signals of authorized and unknown wireless devices, which mitigates false positives and exposes adversarial emitters from unauthorized wireless device(s) operating near frequencies and at power levels of seemingly innocuous wireless device(s). The SMA 100 can automate detection and characterization of unauthorized signals within the wireless environment 130, and even across multiple network tiers (FIG. 4), although manual detection and characterization of unauthorized signals within the wireless environment 130 is also possible. The RF threat detector 112 can compare traffic between network tiers before the signals are converted into RF and transmitted outside the pristine (optical) environment. For example, the RF threat detector 112 can perform signal processing from RF capture through waveform, bitstream, packet, and session processing. That is, traffic between network tiers is compared before the signals are converted into RF and transmitted outside the pristine (optical) environment provided fiber optic cable 120. Through this process it is possible to prevent (or spoof) propagation of adversary wireless signals transmitted by at least one of the wireless devices 136A/136B/136C/136D/136E/136F.

The RF threat detector 112 can identify unauthorized wireless devices, such as at least one of the wireless devices 136A/136B/136C/136D/136E/136F, by analyzing the RF spectrum from the wireless environment 130, subtracting signatures of known authorized wireless devices, such as at least one of the wireless devices 136A/136B/136C/136D/136E/136F, which leaves suspect signatures leftover from this subtraction. In at least one embodiment, the RF threat detector 112, at least one central processing unit (CPU) 620 (FIG. 6), can continuously compare signal characteristics, e.g., Digital Signatures (DS) and Analog Signatures (AS), of at least one of the wireless devices 136A/136B/136C/136D/136E/136F to calculate a degree of statistical correlation and a probability of a match between a modulated signal for at least one of the wireless devices 136A/136B/136C/136D/136E/136F and the RF signal within the threat detector 112.

Furthermore, in at least one embodiment the RF threat detector 112 can monitor optical power levels and report physical disturbances along the fiber optic pathway of the fiber optic cable 120, allowing the RF threat detector 112 to provide its own intrusion- and tamper-detection. The RF threat detector 112 can instantly alert personnel when and where the fiber optic cable 120 has been tampered with, such as being cut. With a resolution of ±10 meters, the RF threat detector 112 can be utilized an embedded micro Optical Time Domain Reflectometer (μOTDR) that identifies a location(s) of fiber faults, without need for additional troubleshooting equipment or technicians.

Whereas typical monitoring systems rely on techniques that require a detailed understanding of wireless network controllers, the SMA 100 can, in at least one embodiment, not require specialized training to use and, consequently, admin labor costs are reduced. Moreover, while a typical compromised access point (AP) can allow an adversary device to use the AP's full-power to get communicated, the SMA's 100 RFoF fiber optic cable 120 can provide a high-fidelity, high-integrity environment within which any malformed packet must be the result of a deliberate, adversarial action by the unauthorized wireless device, not a collision at the AP. In at least one embodiment, another fiber optic cable (not shown) can be used for data distribution between wireless APs, which provides a pristine environment within which area-wide RF spectrum can be captured and analyzed in real-time at the secure headend 110 by the threat detector 112.

For geolocation, modeling the propagation of time difference of arrival (TDOA) is typically impossible with uncooperative wireless devices. In at least one embodiment, the antennas 134A/134B can be frequency spaced antennas. In at least one embodiment, the antennas 134A/134B can be spaced approximately one-third the typical distance of typical commercial MIMO antenna spacing. For example, the antennas 134A/134B can be spaced 20 m apart versus 60 m for typical antennas, and the CPU 620 of the RF threat detector 112 can compare power levels (signal strengths) for signals received by the antennas 134A/134B, respectively, to resolve a coarse geolocation and/or a direction of the wireless devices 136A/136B/136C/136D/136E/136F.

The antennas 134A/134B can allow excising of known/authorized signals and exposure of hidden signals as a process toward threat identification by the RF threat detector 112. In at least one embodiment, the SMA 100 can leverage the National Security Agency's (NSA's) Information Assurance Directorate's Commercial Solution for Classified (CSfC) Program, such as the Mobile Access Capability Package (MA CP). The SMA 100 can extend the capability of the CSfC Program to realize a multi-tiered architecture. Each layered tunnel or "tier" in the SMA 100 can have unique parentage to mitigate potential vulnerabilities related to any one technology or vendor.

Furthermore, the SMA 100 can use full-duplex radio communications and the DAS 140 to remove authorized signals from the wireless environment 130, which allows for discovery of unknown (potentially adversarial) devices hiding within. This exposes unauthorized devices operating near or beneath authorized signals. In at least one embodiment, the wireless environment 130 can include DAS fibers (not shown) cut to specific lengths. Such DAS filters can further enhance SMA's 100 ability to separate known signals from unknown/adversarial signals. In at least one embodiment, this approach also supports deployment of wireless honeypots (not shown).

The SMA 100 can detect, characterize, and monitor the Radio Frequency (RF) signatures of portable electronics and network devices within the wireless environment 130, such as a Tactical Sensitive Compartmented Information Facility (T-SCIF), a Tactical Operations Center (TOC), and/or Forward Operations Base (FOB). The SMA 100 is provider-agnostic and centers on unique collection capabilities afforded by the antennas 134A/134B of the DAS 140 that provides wireless communications with at least one of the wireless devices 136A/136B/136C/136D/136E/136F. In at least one embodiment, the DAS 140 includes closely spaced multiple-input, multiple-output (MIMO) antennas, forming a MIMO DAS. With RF-to-light and light-to-RF converters, such as transceivers 351/352/353/361/362/363 (FIG. 3) operating between, e.g., 20 MHz and 6 GHz, coupled to the RF threat detector 112 and each set of duplexed WIFI or Cellular antennas, respectively, the DAS 140 can connect the SCIF's mission space to the secure headend 110 for centralized cross-domain signals analysis and routing of network traffic, as discussed herein.

Antennas located inside and outside the wireless environment 130 allow clear, binary differentiation between known and unknown (unauthorized) signatures originating inside and outside the wireless environment 130. The RF threat detector 112 can perform coarse location-finding (for internal wireless device(s)) and direction-finding (external wireless device(s)) by comparing signal strengths across the antenna array. The RF threat detector 112 can identify such internal vs. external wireless device(s) using outward-facing antennas and based on their relative signal strengths across an antenna array formed by the antennas 134A/134B. In at least one embodiment, the SMA 100 can, via the DAS 140 infrastructure, support at least one wireless network and, in at least one embodiment, supports multiple concurrent wireless networks (e.g. JWICS, SIPRNet, NIPRNet, CWE, etc.) and any RF technology (e.g., WiFi, cellular, Bluetooth, etc.), provided that the correct peak detection (final RF power requirement and third harmonic) has been properly factored into the transceiver selection. In at least one embodiment, the RF threat detector 112 can dynamically size physical service areas of networks operating at different classification levels within the wireless environment 130, separated, and/or overlapped (e.g., NIPRNET and SIPRNET into a common area) entirely from the secure headend 110. Once antenna array elements, e.g., antennas 134A/134B, have been positioned, the RF threat detector 112 can manage provisioning and configuration of networks within the wireless environment 130 from the secure headend 110. The maximum physical size (footprint) of any given network within the wireless environment 130 is limited by environmental characteristics affecting RF signal propagation and number of APs utilized. Typically, one AP provides approximately 2500 square feet of wireless coverage. The SMA 100, via the RF threat detector 112, can maintain broadband surveillance and intrusion detection across all networks within the wireless environment 130.

In at least one embodiment, the RF threat detector 112 can be coupled to one or more data access points 114, such as JWICS access points 114A, SIPRNET access points 114B, NIPRNET access points 114C, and/or any other RF communications "COMMS" access points 114D. All such wireless network APs can remain inside EMI/RFI enclosures (not shown) within the secure headend 110. Thus, in at least one embodiment the only RF emitters inside the wireless environment 130 are the antennas 134A/134B, e.g., duplex antennas. In at least one embodiment, the antennas 134A/134B can be integrated within lightweight antenna array elements (not shown). The RF threat detector 112 can precisely control, e.g., via dynamic attenuators (not shown) power levels of the antennas 134A/134B.

The RF threat detector 112 can be further coupled to a fiber optic transceiver 118 that is coupled to the fiber optic cable 120, and the fiber optic cable 120 is further coupled to another fiber optic transceiver, such as fiber optic transceiver 132. The RF threat detector 112 performs cross-domain RF threat detection utilizing the two fiber optic transceivers, such as fiber optic transceivers 118/132 that can be further coupled to multiplexers (not shown). In at least one embodiment, the fiber optic transceiver 118 within the secure headend 110 can be a rack-mounted transceiver, such as part number A03-J4DW6-AD-M-Q, by Optical Zonu Corporation. In at least one embodiment, the fiber optic transceiver 132 within the wireless environment 130 can be a remote transceiver that is typically installed in a weather- and dust-proof box (e.g., part number IP-67), such as A03-TLFCW-D31-DWS-S, by Optical Zonu Corporation. The fiber optic transceivers 118/132 convert light into RF and RF into light, and the multiplexers combine encrypted network traffic and data from the fiber optic transceivers 118/132 for transport over the fiber optic cable 120. The fiber optic transceiver 132 is further coupled to at least one antenna, such as duplex multiband antennas 134A/134B. In at least one other embodiment, the SMA 100 can include more or less antennas than that shown in FIG. 1. In at least one embodiment, the antennas 134A/134B are deployed in pairs, two per AP. In at least one embodiment, the antennas 134A/134B and the RFoF transceiver 132 can be included within a sealed plug-and-play case, with soldiers needing only position such cases and connect the fiber optic cable 120 to the RFoF transceiver 132. The RF threat detector 112 can use a receive profile of an internal DAS antenna (e.g. hot under one antenna and cooler as distance increases) to identify external wireless devices that show a more even distribution signal across all antenna within the wireless environment 130.

The RF threat detector 112 can analyze the wireless environment's 130-wide RF spectrum, in real-time.

Whereas typical TSCM equipment must be positioned at various locations within a facility (via movement that can tipoff an adversary), the SMA 100 routes all RF signals from the wireless environment 130 through a centralized headend, such as the secure headend 110. Since the secure headend 110 is centralized to receive all RF signal from the wireless environment 130, the secure headend 110 can utilize a single set of spectrum monitoring equipment, such as the RF threat detector 112, for an entire environment, such the wireless environment 130. Furthermore, the RF threat detector 112 can perform monitoring continuously without potentially alerting adversaries, such as users of unauthorized wireless devices. This centralized monitoring by the RF threat detector 112 also makes possible use of sophisticated monitoring and surveillance assets that, for cost and/or logistical reasons, cannot be easily deployed to multiple locations within large facilities.

The fiber optic cable 120 provides for RFoF distribution between the access points 114A-D coupled to the SMA 100 and provides a pristine environment within which wide RF spectrum from the wireless environment 130 can be captured and analyzed for threats, as discussed herein. The fiber optic cable 120 providing for RFoF distribution between the access points 114A-D coupled the SMA 100 embodiment offers benefits over typical TSCM. For example, such embodiment(s) provides cost savings since only one set of TSCM equipment can be used per site/building. Additionally, such embodiment(s) increases a probability of successfully detecting "suspicious" signals since adversaries cannot know when, where, or how TSCM operations are being conducted since those functions are implemented in a secure remote location. Moreover, such embodiment(s) can provide continuous monitoring (24×7×365) that provides the most accurate baselining and, as a result, reduces the potential for false-positives. The SMA 100 provides an ability to selectively power OFF and ON individual remote transceivers (or zones of remote transceivers), allowing administrators to pinpoint a location of an intruder/unauthorized device.

In at least one embodiment, each network's traffic can be isolated by discrete multi-layered encryption. For example, each network that is transported via the fiber optic cable 120 can be secured by dedicated tunnel-pairs of Virtual Private Networks (VPNs), i.e., "Tunnels within Tunnels", per National Security Agency (NSA) Commercial Solution for Classified (CSfC) capability package. For example, these tunnels can include at least one of a CSfC JWICS tunnel-pair 122, a CSfC SIPRNET tunnel-pair 124, and a CSfC NIPRNET tunnel-pair 126.

In at least one embodiment, at least one of the wireless devices 136A/136B/136C/136D/136E/136F is a medical wireless device, such as a diabetic meter, heart monitor, etc. While it may not be desirable to allow entry of certain classes of portable wireless device(s) into the wireless environment 130, such as those typically used for fitness, (e.g. Bluetooth-enabled Fitbits), the RF threat detector 112 can allow trusted exfil of such medical wireless device(s)/data. For example, the RF threat detector 112 can allow a heart monitor to pass via cellular over the DAS 140, such as through a wireless firewall. To ensure that only authorized signals are going out, in at least one embodiment at least one of the antennas 134A/134B can be a parasitic antenna used to send an out-of-band authentication signal when it detects the medical device's RF activity. The time-correlation of a pseudo random authentication signal and medical device signal indicates that a valid signal is being propagated. The authentication signal is then stripped off before exfil. In at least one embodiment, a medical devices' signal authentication and gating (permitted exfil) is tied to the facility's access control system. In this embodiment, the parasitic antenna is disabled when the medical device is either not present or not in use, since its associated user is not present.

Figure 2:
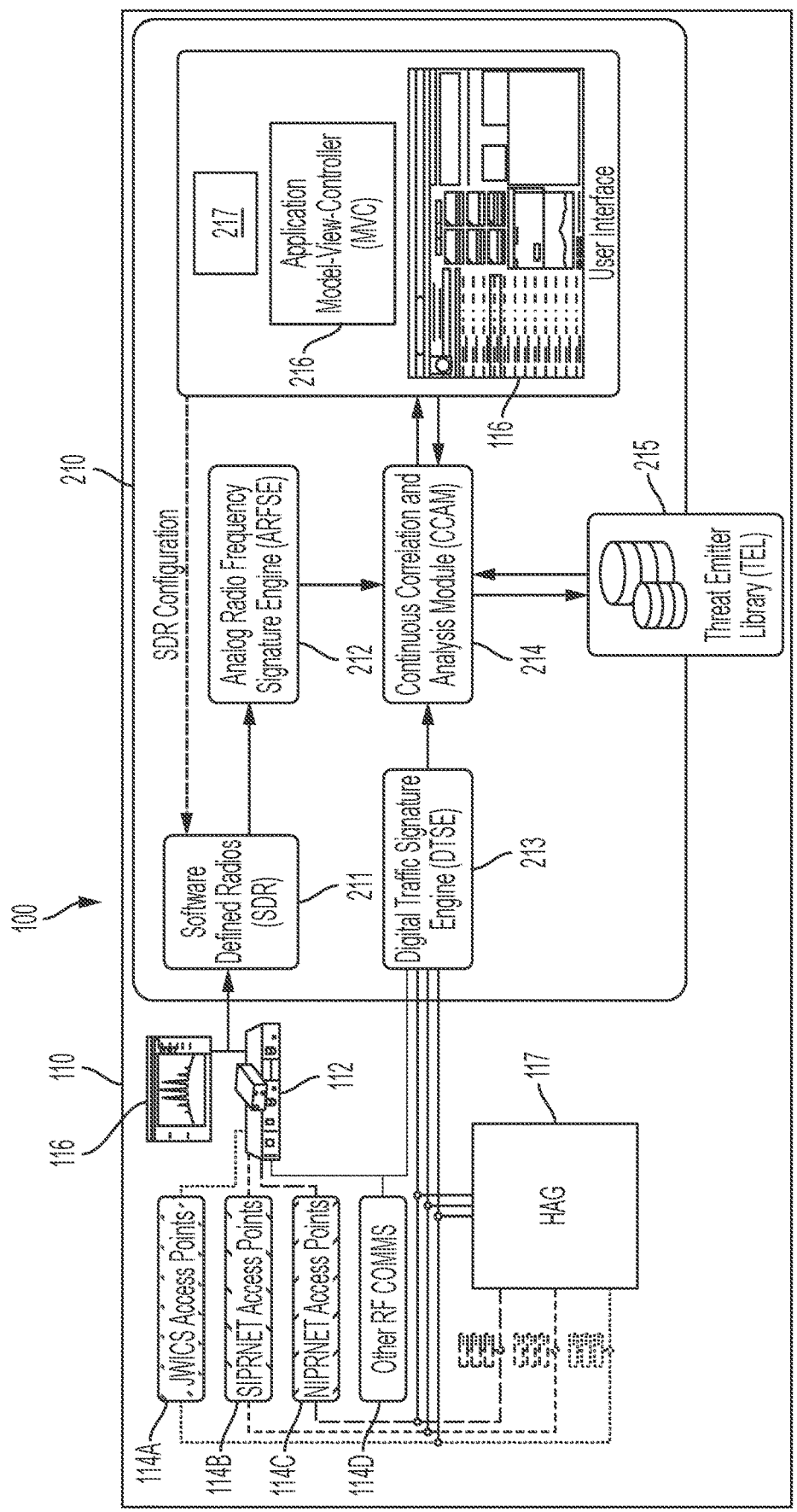
FIG. 2 illustrates example components of the RF threat detector from FIG. 1, in accordance with at least one embodiment disclosed herein.

Referring now to FIG. 2, example components (which can be hardware and/or software) of the RF threat detector 112 from FIG. 1 are illustrated. In particular, the RF threat detector 112 can include an Automated Radio Frequency Threat Detection Software Application (ARFDSA) 210 that characterizes and alerts on discrepancies between the digital and analog signatures of authenticated network devices (authorized devices) and unauthenticated devices (unauthorized devices). As an example, the ARFDSA 210 is described with reference to a broadband RFoF DAS 140 capable of transporting signals, in a manner that preserves native RF signal characteristics to facilitate threat detection at the secure headend 110, such as RF energy propagating within wireless environment 130 at any frequency range, by at least one Software Defined Radio (SDR) 211. The DAS 140 can be clustered, such as to include MIMO multipath clusters that provide a layer of physical security for the SMA 100. Unintended emissions from the wireless environment 130, that is RF signals that escape the wireless environment 130 cannot be demodulated when received outside a MIMO cluster. Multipath clusters inherent to the DAS 140 provide a layer of physical security since these unintended emissions cannot be demodulated when received outside the MIMO cluster. In accordance with at least one embodiment, this disclosure applies to other antenna systems, for example at least one of the antennas 134A/134B can be a single-input single-output (SISO) antenna system.

The ARFDSA 210 can include a number of software modules/libraries, such as the SDR 211, a Digital Traffic Signature Engine (DTSE) 213, an Analog Radio Frequency Signature Engine (ARFSE) 212, a Continuous Correlation and Analysis Module (CCAM) 214, an Application Model-View-Controller (AMVC) 216, and a Threat Emitter Library (TEL) 215 and/or 217. In other embodiments, the ARFDSA 210 can include more or less software modules/libraries. As illustrated, the CCAM 214 can be coupled to the ARFSE 212, the DTSE 213, the AMVC 216, and the TEL 217, in that the CCAM 214 can receive data from the ARFSE 212 and the DTSE 213, and can further send and receive data from the UI 116 and the TEL 217. The DTSE 213 can be further coupled to one or more ports of the RF threat detector 112, such as one or more of the JWICS access points 114A, SIPRNET access points 114B, NIPRNET access points 114C, and/or other RF communications "COMMS" 114D. In at least one embodiment, the DTSE 213 can be further coupled to a High Assurance Guard (HAG) 117 that can facilitate injection of decrypted IP traffic onto the fiber optic cable 120 from other networks (not shown). These other networks can include the unencrypted, plain-text traffic sets of the same, previously listed classified networks; e.g., SIPRNET, JWICS, etc. In such cases, CSfC is not required or used. Instead, each network is transported over its own dedicated physical infrastructure which is physically protected and EMI/RFI shielded in accordance with existing regulations; e.g. National Industrial Security Program Operating Manual (NISPOM). This is the current model used to transport classified networks within SCIFs and, in such cases, encrypted network traffic entering the facility is decrypted in the secure headend 110 and distributed (unencrypted) via the secure infrastructure discussed herein to each client device, such as the wireless devices 136A/136B/136C/136D/136E/136F. In such cases, the HAG 117 co-located with appropriate network equipment (switches, routers) can facilitate "low to high" merging of network traffic and cross-correlation with the RF traffic unique to each traffic set. For example, the HAG 117 can include network servers (not shown), network switches (not shown), and Content Management System (CMS) (not shown).

The AMVC 216 can include, in at least one embodiment, at least one third-party library for digital and analog data processing analysis. The AMVC 216 can further generate the UI 116 that provides information associated with at least one of the wireless devices 136A/136B/136C/136D/136E/136F. In at least one embodiment, the UI 116 can be used to configure the SDR 211.

The DTSE 213, via the CPU 620, can analyze device-specific and port-specific network protocol message packets. The CPU 620 can uniquely characterize messages sent and received by authenticated, authorized network wireless devices 136A/136B/136C/136D/136E/136F. In at least one embodiment, the at least one CPU 620 can produce DS that uniquely characterize these messages based on these analyzed device-specific and port-specific network protocol message packets. In at least one embodiment, the DS of these messages are catalogued, indexed, and correlated with AS that are produced by the ARFSE 212. In at least one embodiment, the DS of these messages can include a collection of metadata describing an analog signal coupled with the digital representation of that AS, as received by the SDR 211 and stored in a database as a combination of audio and spectrum data. For example, the DS can include a list of analog RF signals that have been recorded and correlated with known or suspected clients, such as the wireless devices 136A/136B/136C/136D/136E/136F, Each RF signal is stored as audio and spectrum (waterfall) data. In at least one embodiment, the CPU 620 can digitally record the RF signals produced by the network wireless devices 136A/136B/136C/136D/136E/136F as audio data, this audio data being the DS for the network wireless devices 136A/136B/136C/136D/136E/136F, and can store this audio data n a database. An example of similar recording of RF signals is provided at https://www.sigidwiki.com/wiki/Database. These digital signatures and associated metadata would be persisted in formats similar to other RF signal databases, such as the Signal Identification Guide at https://www.sigidwiki.com. For example, the CPU 620 can analyze at least one RF signal produced by at least one of the transceivers 351/352/353 and generate at least one DS associated with at least one of the network wireless devices 136A/136B/136C/136D/136E/136F, respectively, based on the analysis of the at least one second RF signal. The CPU 620 can further determine if at least one of the network wireless devices 136A/136B/136C/136D/136E/136F associated with the at least one DS, respectively, is one of an authorized device and an unauthorized device.

The SDR 211 can receive digitized RF signals that correspond to the RF wireless signals received by the antennas 134A/134B in the wireless environment 130. The RF threat detector 112 can correlate these digitized RF signals received by the SDR 211 with authorized network traffic (deduced from real-time packet analysis and device/user profiles) mapped against RF signal characteristics of known, authenticated devices, the RF threat detector 112 can detect, locate, and remove (excise) unauthorized signals from a mission space, such as the wireless environment 130.

The ARFSE 212 can receive, from the SDR 211, the digital representations of the analog radio frequency signals transported by the DAS 140. The ARFSE 212 can characterize the AS according to an extensible collection of attributes including, but not limited to, signal power level(s) as measured at one or more receiving antenna array elements, signal waveform data, and signal timing data, each associated with individual ones of the wireless devices 136A/136B/136C/136D/136E/136F, respectively.

The CCAM 214 can continuously compare signal characteristics of the modulated and demodulated signals processed by the DTSE 213 and ARFSE 212 to calculate the degree of correlation and probabilities of 1-to-1 AS-DS matches. AS-DS discrepancies are flagged for a user alert by the CPU 620 of the RF threat detector 112, and for further analysis by the CPU 620 of the RF threat detector 112. Further analysis by the CCAM 214 can include, alternatingly or concurrently processing of discrete signals within the collected spectrum, sets of discrete signals within the collected spectrum, and/or the totality of collected spectrum data as one source of information within which a hidden message (e.g., RF emissions from one or more of the wireless devices 136A/136B/136C/136D/136E/136F attempting to surreptitiously exfiltrate data) may be contained. Accordingly, analytic processes of the CCAM 214 can include steganographic and/or cryptographic methods.

The TEL 217 can be a database of wireless devices known and/or suspected to provide signal monitoring, collection, re-transmission, or communication capabilities that may constitute a threat to the security of the wireless environment 130. In at least one embodiment, the TEL 217 can be a third-party repository of device descriptions and attributes that interfaces with the RF threat detector 112 through an Application Programing Interface (API), and/or the TEL 217 can be directly integrated within a suite of software components of the RF threat detector 112. In at least one embodiment, the RF threat detector 112 can lack the TEL 217 and/or TEL data for the RF threat detector 112 to function as a threat detector as the RF threat detector 112 can instead include an "Emitter Search Aid" instead. In this context, "Emitter Search Aid" refers to any information provided to the user that would assist their physical search and discovery of the physical device or devices (i.e., emitters) that the RF threat detector 112 has detected. In the case of the TEL 217, the search aid can constitute photos, waveforms or waveform representations, and/or text descriptions of devices(s) known or believed to emit RF at a frequency(ies) and power level(s) like the detected emitter, such as the wireless devices 136A/136B/136C/136D/136E/136F. A waveform or waveform representation could be an image of a waveform (i.e. spectrum snapshot) or a recorded waveform which can be of the type that can be played back on, for example, a digital audio player (i.e., wave or MP3 file player).

The UI 116 can display lists of authenticated, authorized network device attributes including, but not limited to, Internet Protocol (IP) and Media Access Control (MAC) addresses, network tier assignment(s), operating frequency or frequency ranges, and calculated physical locations based on signal power measurements across the duplex multiband antennas 134A/134B of the DAS 140. The UI 116 can further display a representation of physical zones and associated network services transported therein by the DAS 140 and can display real-time message traffic being analyzed and characterized by the DTSE 213 and ARFSE 212. The UI can even further display RF spectrum and AS characteristics being received by the SDR 211 and processed by the ARFSE 212 and can display alert status indicators that highlight potential AS-DS discrepancies with related signal characteristics including, but not limited to, the calculated physical locations of suspected unauthorized signal emitters, operating frequency or frequency ranges, AS and DS characteristics, and, if TEL 217 data is available, physical descriptions of possible sources of the anomalous signals to aid in the search for unauthorized emitters.

Thus, the SMA 100 can enhance detection of electronic surveillance and data exfil, enhances detection and location of unauthorized portable wireless device(s), such as any of wireless devices 136A/136B/136C/136D/136E/136F, and/or improves, and in at least one embodiment, can automate aspects of TSCM across the spectrum of anticipated surveillance attacks. The SMA 100 can provide broad spectrum monitoring via the DAS 140. The SMA 100 can simplify how adversarial surveillance activities and wireless devices, such as any of wireless devices 136A/136B/136C/136D/136E/136F, are detected, identified, located, and countered, as discussed in more detail below.

The SMA 100 can span facility infrastructure, e.g., the secure headend 110, the fiber optic cable 120, and the wireless environment 130. The SMA 100 can improve security in several ways while simultaneously increasing operational capabilities by enabling the use of the wireless devices 136A/136B/136C/136D/136E/136F within SMA 100. In at least one embodiment, the SMA 100 can leverage Commercial Off The Shelf (COTS) and open-source technologies, with the SMA 100 defining all functional components, security boundaries, communication paths, and advanced monitoring on both the wireless devices and the infrastructure of the SMA 100. In at least one other embodiment, the SMA 100 can use custom built and custom source technologies, without departing from the scope of the disclosure. The SMA 100 can also support multiple networks concurrently (e.g. commercial cellular, unclassified WIFI, classified WIFI, etc.) via a common fiber path, such as the fiber optic cable 120. This can allow for consolidated, wideband spectrum monitoring, and/or significant infrastructure cost reductions.

Figure 3:
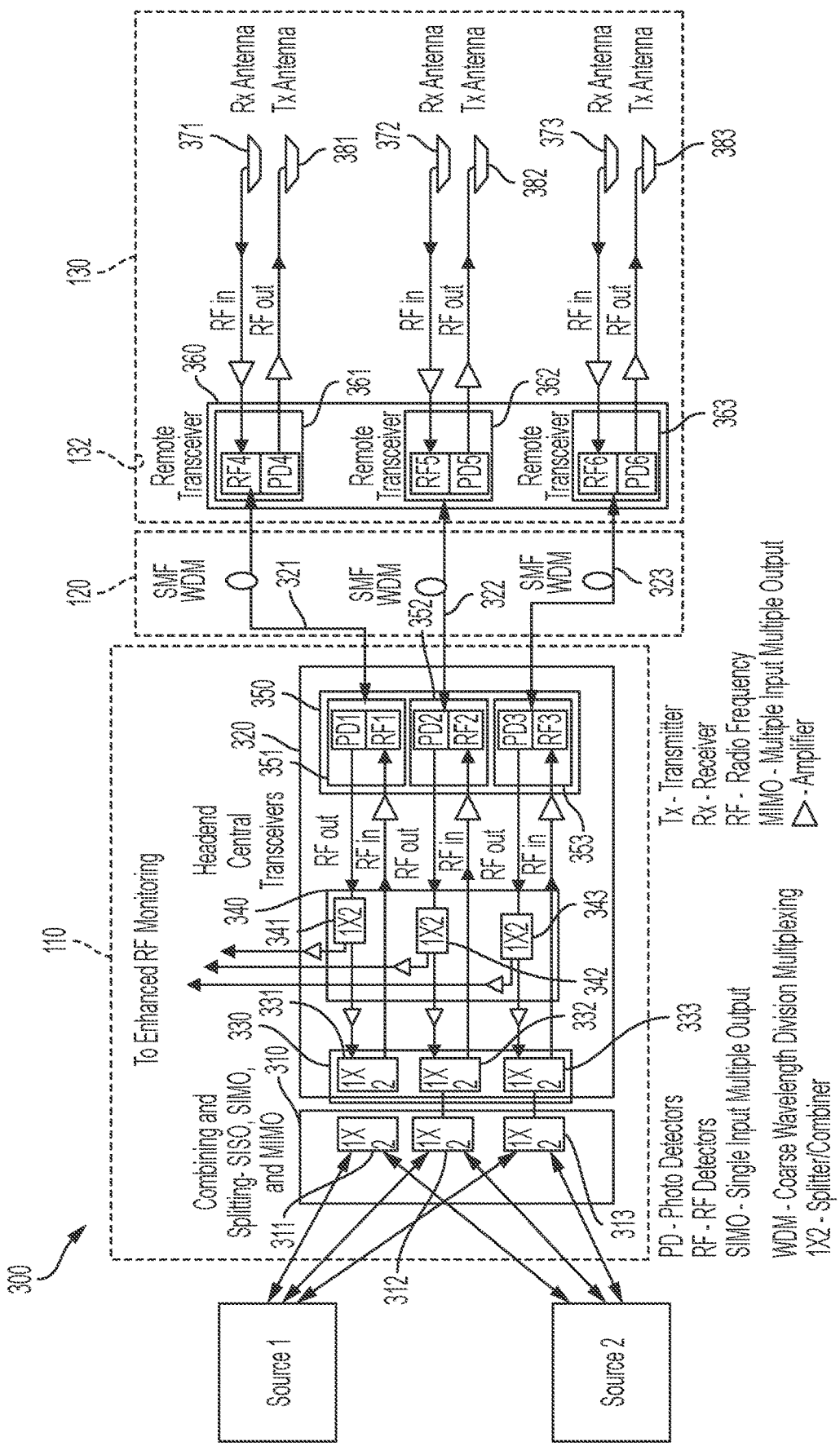
FIG. 3 illustrates an example antenna deployment architecture that can be used by the system shown in FIG. 1, in accordance with at least one embodiment disclosed herein.

FIG. 3 illustrates an antenna deployment architecture 300 that can be used by the SMA 100. Various amplifiers are shown in FIG. 3 as known to those skilled in the art and will not be discussed in detail herein. The antenna deployment architecture 300 can utilize an antenna deployment scheme that can include at least one SMF that enhances monitoring of the RF spectrum, such as from 450 MHz through 6 GHz. This range can include commercial cellular (3G/LTE 4G, 5G), Bluetooth, and WIFI devices. With additional commercially available RFOF transceivers, spectrum monitoring can be extended to 40 GHz (5G cellular), thus including SATCOM and a wide variety of other communications devices. The secure headend 110 can accomplish location-finding of wireless devices, e.g., at least one of the wireless devices 136A/136B/136C/136D/136E/136F, within the antenna deployment architecture 300 by comparing signatures of the wireless devices 136A/136B/136C/136D/136E/136F and signal strength differences measured between the antennas 134A/134B. At least some of the antennas 134A/134B can be externally-mounted, outward-facing antennas. These externally-mounted, outward-facing antennas allow the secure headend 110 to detect and differentiate threat emitters inside and outside the antenna deployment architecture 300.

The secure headend 110 can include in this example a first bank of splitters/combiners 310, such as a multiplexer. In at least one embodiment, the first bank of splitters/combiners 310 can be multiplexer part number ADR-JDDAFW-0Q. In this example, the first bank of splitters/combiners 310 can include first, second, and third splitters/combiners 311/312/313, respectively, although more or less splitters/combiners are possible. The first splitter/combiner 311 can be coupled to a Source 1 and a Source 2, the second splitter/combiner 312 can also be coupled to the Source 1 and the Source 2, and the third splitter/combiner 313 can also be coupled to the Source 1 and the Source 2, although more or less Sources are possible. In at least one embodiment, the Source 1 and Source 2 can be any of the JWICS access points 114A, SIPRNET access points 114B, NIPRNET access points 114C, and/or any other RF communications "COMMS" access points 114D, shown in FIG. 1.

The bank of splitters/combiners 310 can be coupled to a headend central transceiver 320. The headend central transceiver 320 can include a second bank of splitters/combiners 330. The second bank of splitters/combiners 330 can include can include first, second, and third splitters/combiners 331/332/333, respectively, although more or less splitters/combiners are possible. The first, second, and third splitters/combiners 311/312/313 can be coupled to the first, second, and third splitters/combiners 331/332/333, respectively. The headend central transceiver 320 can include a third bank of splitters/combiners 340 that can include first, second, and third splitters/combiners 341/342/343, respectively, although more or less splitters/combiners are possible. The first, second, and third splitters/combiners 341/342/343 can be coupled to the first, second, and third splitters/combiners 331/332/333, respectively, and further to an apparatus that performs enhanced RF monitoring, such as the RF threat detector 112.

The headend central transceiver 320 can further include in this example a bank of local transceivers 350 that, in at least one embodiment corresponds to the fiber optic transceiver 118, and are local to the RF threat detector 112. The bank of local transceivers 350 can include first, second, and third local transceivers 351/352/353, respectively, although more or less light-to-RF transceivers are possible. Each of the first, second, and third local transceivers 351/352/353 can include both a light-to-RF converter and an RF-to-light converter, as discussed below. For example, each of the first, second, and third local transceivers 351/352/353 can include first, second, and third photo detectors PD1/PD2/PD3 (light-to-RF converters) that receive light signals from the fiber optic cable 120 and convert these light signals into corresponding RF signals. The first, second, and third local transceivers 351/352/353 can further include first, second, and third RF detectors RF1, RF2, RF3 (RF-to-light converters) that receive RF signals and convert these RF signals into corresponding light signals.

In at least one embodiment, the fiber optic cable 120 can include first, second, and third optical fibers 321/322/323, although more or less optical fibers are possible. The first, second, and third local transceivers 351/352/353 can be coupled to first, second, and third optical fibers 321/322/323, respectively. The wireless environment 130 can include, in this example, a bank of remote transceivers 360. The bank of remote transceivers 360 can include first, second, and third remote transceivers 361/362/363. Each of the first, second, and third remote transceivers 361/362/363 can include both a light-to-RF converter and an RF-to-light converter, as discussed below. Each of the first, second, and third remote transceivers 361/362/363 can include first, second, and third photo detectors PD4/PD5/PD6 (light-to-RF converters) that each receive light signals and convert these light signals into corresponding RF signals. The first, second, and third remote transceivers 361/362/363 further include first, second, and third RF detectors RF4/RF5/RF6 (RF-to-light converters) that receive RF signals and convert these RF signals into corresponding light signals. The first, second, and third local transceivers 351/352/353 of the headend central transceiver 320 are coupled to the first, second, and third remote transceivers 361/362/363 of the fiber optic transceiver 132, via the first, second, and third optical fibers 321/322/323, respectively. The wireless environment 130 can further include first, second, and third receiving antennas 371/372/373 and first, second, and third transmitting antennas 381/382/383. The first, second, and third receiving antennas 371/372/373 and the first, second, and third transmitting antennas 381/382/383 are coupled to the first, second, and third remote transceivers 361/362/363, respectively. The first, second, and third transmitting antennas 381/382/383 can be used to transmit RF data signals to at least one wireless device, such as at least one of the at least one of the wireless devices 136A/136B/136C/136D/136E/136F.

During operation, the first, second, and third receiving antennas 371/372/373 can receive RF data signals from the wireless devices 136A/136B/136C/136D/136E/136F that are proximate to the first, second, and third receiving antennas 371/372/373. These RF data signals can be converted into light by the first, second, and third remote transceivers 361/362/363, this light preserving native RF energy characteristics of RF data signals received by the first, second, and third remote transceivers 361/362/363. This light is output by the first, second, and third remote transceivers 361/362/363 to the first, second, and third local transceivers 351/352/353, via the first, second, and third optical fibers 321/322/323, respectively. The first, second, and third local transceivers 351/352/353 can convert these received light signals into other RF signals that have substantially the same native RF energy characteristics as the RF data signals received by the first, second, and third remote transceivers 361/362/363. The first, second, and third local transceivers 351/352/353 can output these RF signals to the first, second, and third splitters/combiners 341/342/343, respectively, which can output these RF signals to the RF threat detector 112 for performing threat detection as described above. Sources 1/2 can output data signals to the wireless devices 136A/136B/136C/136D/136E/136F, via the fiber optic cable 120, in a typical manner know to those skilled in the art and will not be discussed in detail herein.

Figure 4:
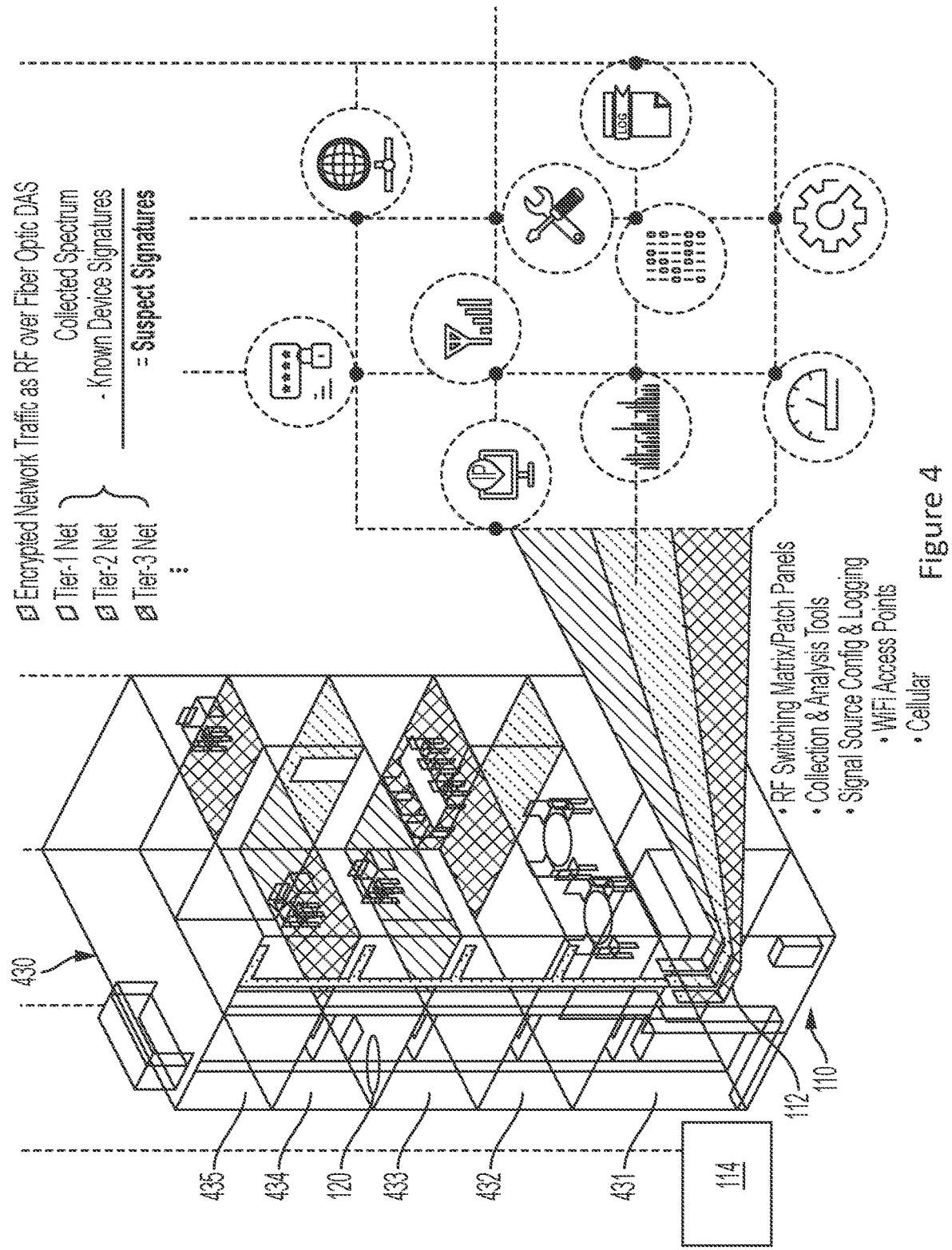
FIG. 4 illustrates an example of the system shown in FIG. 1 installed within a multi-story building, in accordance with at least one embodiment disclosed herein.

With reference to FIG. 4, system 400 is illustrated in which the SMA 100 is installed within a multi-story building, such as building 430. For example, the wireless environment 130 can be the building 430 shown. In at least one other embodiment, the wireless environment 130 can be other environments, such as a battlefield, a stadium, a park, a school, or any other wireless environment that needs to be secured against use by unauthorized wireless devices. In this example, the building 430 can be a five (5) story building, with the secure headend 110 being located within the first floor 431 of the multi-story building 430. In at least one other embodiment, the secure headend 110 can be located on another floor of the multi-story building 430 or even in another location at some distance (miles) away from the multi-story building 430, the secure headend 110 also including, e.g., an RF switching matrix/patch panels, collection & analysis tools, such as the RF threat detector 112, and signal source configuration and logging functions (e.g. for WiFi access points, cellular, etc.).

As shown, there can be three (3) tier networks disposed within the multi-story building 430, a Tier-1 network, a Tier-2 network, and a Tier-3 network, although in other embodiment(s) more or less Tiers can be included within the building 430. In this example, the fiber optic cable 120 can be disposed along the left side of the building 430 shown to transport all data signals to and from the RF threat detector 112 and the wireless devices 136A/136B/136C/136D/136E/136F within the four floors 432/433/434/435 of the building 430, although other locations for the fiber optic cable 120 are possible. Multiple Tiers can be disposed on a single floor of the building 430. For example, the second floor 432 can include one or more of the wireless devices 136A/136B/136C/136D/136E/136F on the Tier-2 network and the Tier-3 network, the third floor 433 can include one or more of the wireless devices 136A/136B/136C/136D/136E/136F on the Tier-1 network and the Tier-3 network, the fourth floor 434 can include one or more of the wireless devices 136A/136B/136C/136D/136E/136F on the Tier-1 network, Tier-2 network, and the Tier-3 network, and the fifth floor 435 can include one or more of the wireless devices 136A/136B/136C/136D/136E/136F on the Tier-3 network, as shown.

Figure 5:
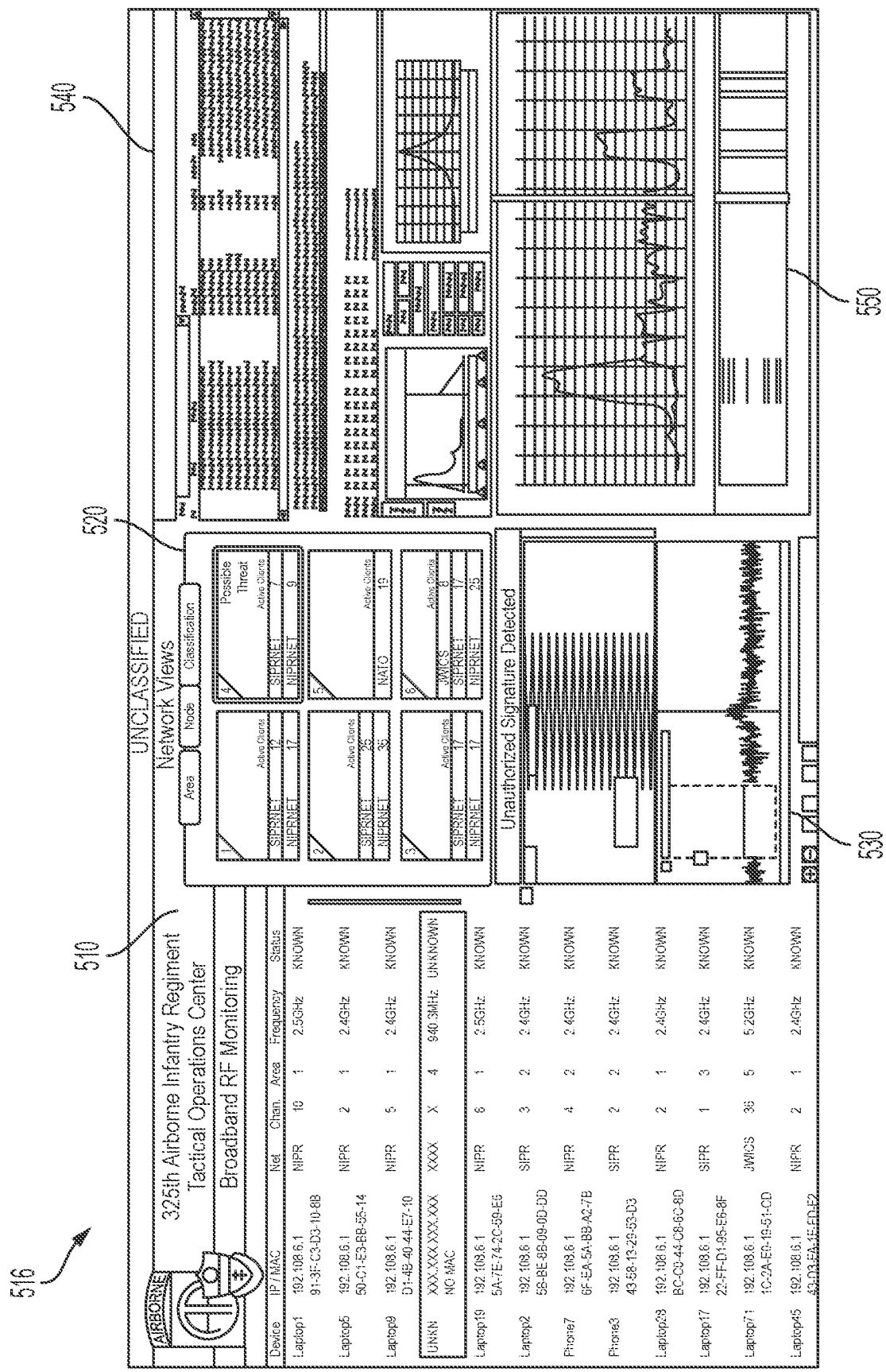
FIG. 5 illustrates an example User Interface (UI) for use with the system shown in FIG. 1, in accordance with at least one embodiment disclosed herein.

Now with reference to FIG. 5, an example of the UI 116, shown as UI 516, for use with the SMA 100. In this example, the UI 516 can include various windows of information, such as a wireless device information window 510, a network views window 520, an unauthorized signature detected window 530, an RF to digital signature correlation window 540, and an RF snapshot window 550. The wireless device information window 510 can provide a user of the RF threat detector 112 with information associated with one or more of the wireless devices 136A/136B/136C/136D/136E/136F within the wireless environment 130, such as a type of wireless device within the wireless environment 130 (column 1), an IP address/MAC address (column 2), a type of network (column 3), a channel (column 4), an area within the wireless environment 130, a frequency (column 5), and a status (column 6). As shown, all of the wireless devices within the wireless environment 130 are known devices exception a wireless devices with a device type of "UNKN", having an IP address of "XXX.XXX.XXX.XXX" and a MAC address of "NO MAC", within the "XXXX" network, in area "4", operating on the 940.3 MHz frequency, and having an "UNKNOWN" status. A user viewing the UI 516 shown in the example of FIG. 5 can quickly identify an unknown wireless device transmitting within the wireless environment 130, even within a particular area within the wireless environment 130 area "4". The information provided by the UI 516 can allow a user to respond accordingly, such as investigating the source of the transmission.

Figure 6:
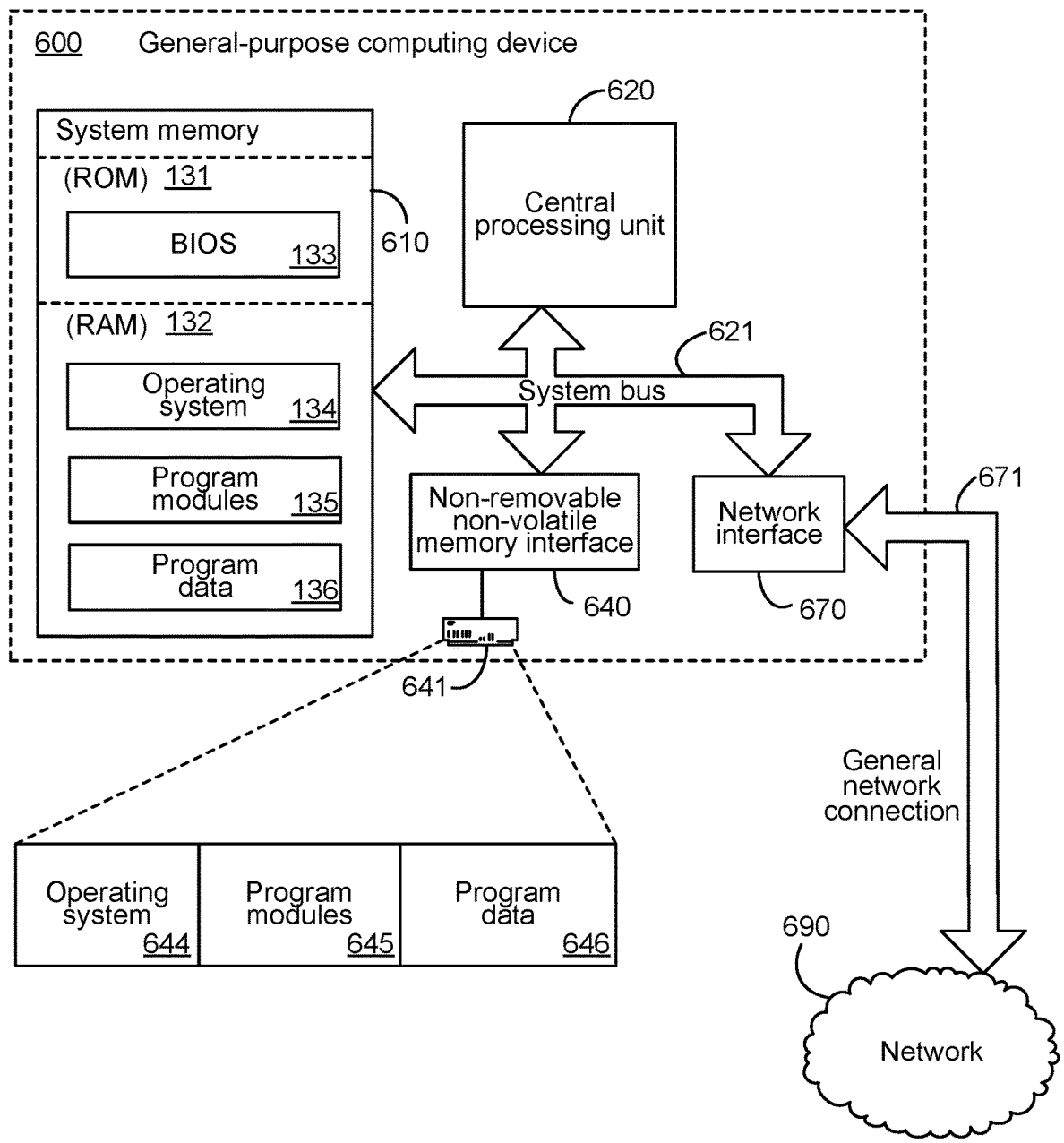
FIG. 6 illustrates an exemplary general-purpose computing device for use by the system disclosed in FIG. 1, in accordance with at least one embodiment disclosed herein.

With reference to FIG. 6, an exemplary general-purpose computing device is illustrated in the form of the exemplary general-purpose computing device 600 that can be used by the SMA 100. The general-purpose computing device 600 can be of the type utilized for the RF threat detector 112 and/or the wireless devices 136A/136B/136C/136D/136E/136F, as well as the other computing devices with which the RF threat detector 112 and/or the wireless devices 136A/136B/136C/136D/136E/136F can communicate through an outside communication network 690. As such, it will be described with the understanding that variations can be made thereto. The exemplary general-purpose computing device 600 can include, but is not limited to, one or more processors, such as the CPU 620, a system memory 610 and a system bus 621 that can couple various system components including the system memory to the processing unit 620. The system bus 621 can be any of several types of bus structures including a memory bus or memory controller, a peripheral bus, and a local bus using any of a variety of bus architectures. Depending on the specific physical implementation, one or more of the CPUs 620, the system memory 610 and other components of the general-purpose computing device 600 can be physically co-located, such as on a single chip. In such a case, some or all of the system bus 621 can be nothing more than communicational pathways within a single chip structure and its illustration in FIG. 6 can be nothing more than notational convenience for the purpose of illustration.

The general-purpose computing device 600 can also typically include computer readable media, which can include any available media that can be accessed by computing device 600. By way of example, and not limitation, computer readable media can comprise computer storage media and communication media. Computer storage media can include media implemented in any method or technology for storage of information such as computer readable instructions, data structures, program modules or other data. Computer storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 600. Communication media typically embodies computer readable instructions, data structures, program modules or other data in a modulated data signal such as a carrier wave or other transport mechanism and includes any information delivery media. By way of example, and not limitation, communication media can include wired media such as a wired network or direct-wired connection, and wireless media such as acoustic, RF, infrared and other wireless media. Combinations of the any of the above should also be included within the scope of computer readable media.

When using communication media, the general-purpose computing device 600 can operate in a networked environment via logical connections to one or more remote computers. The logical connection depicted in FIG. 6 is a general network connection 671 to the network 690, which can be a local area network (LAN), a wide area network (WAN) such as the Internet, or other networks. The computing device 600 can be connected to the general network connection 671 through a network interface or adapter 670 that is, in turn, connected to the system bus 621. In a networked environment, program modules depicted relative to the general-purpose computing device 600, or portions or peripherals thereof, may be stored in the memory of one or more other computing devices that are communicatively coupled to the general-purpose computing device 600 through the general network connection 671. It will be appreciated that the network connections shown are exemplary and other means of establishing a communications link between computing devices may be used.

The general-purpose computing device 600 may also include other removable/non-removable, volatile/nonvolatile computer storage media. By way of example only, FIG. 6 illustrates a hard disk drive 641 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640.

The drives and their associated computer storage media discussed above and illustrated in FIG. 6, can provide storage of computer readable instructions, data structures, program modules and other data for the general-purpose computing device 600. In FIG. 6, for example, hard disk drive 641 is illustrated as storing operating system 644, other program modules 645, and program data 646. Note that these components can either be the same as or different from operating system 644, program modules 645 and program data 646. Operating system 644, other program modules 645 and program data 646 are given different numbers here to illustrate that, at a minimum, they are different copies.

Figure 7:
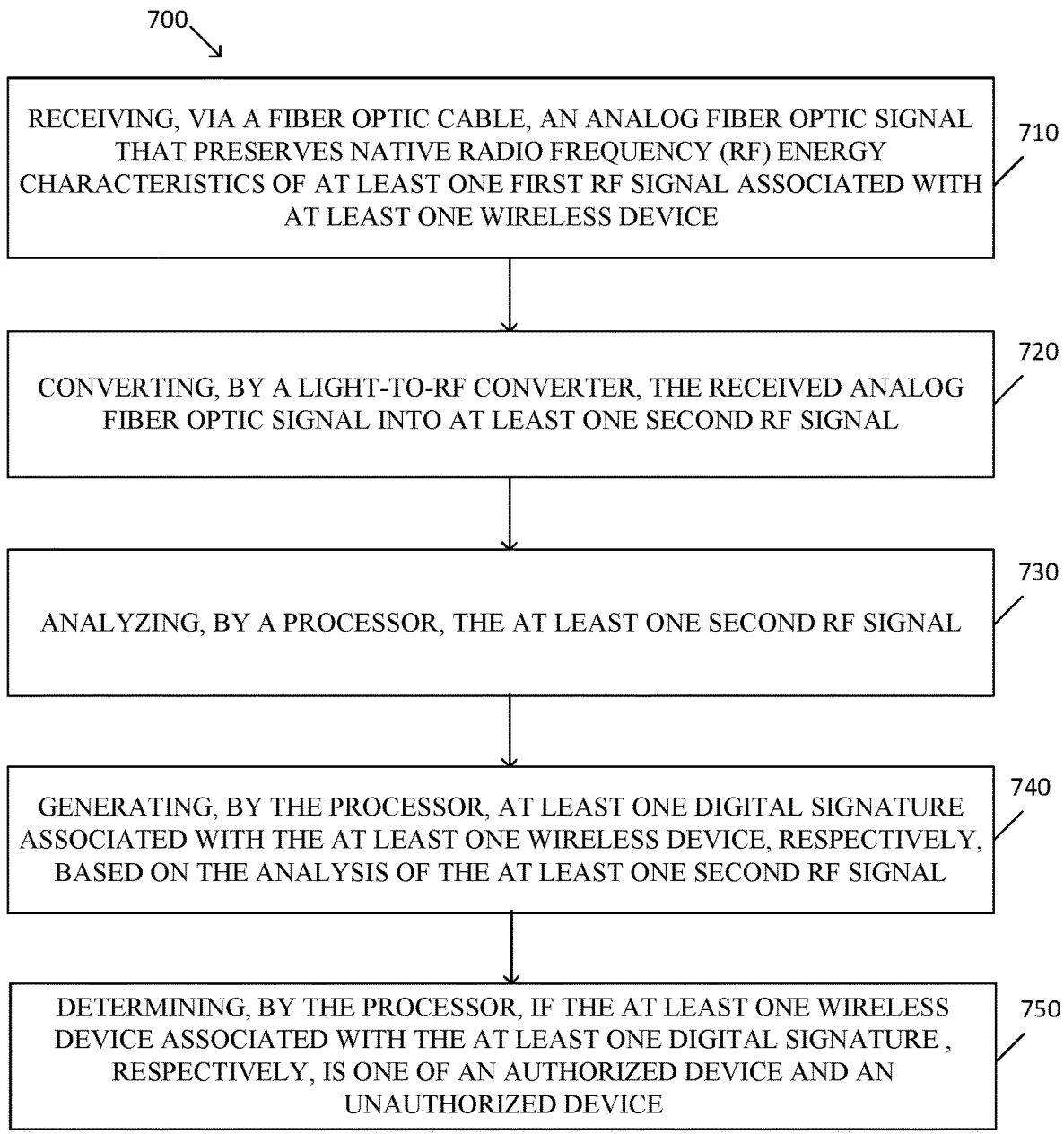
FIG. 7 illustrates an example method for securing the wireless environment, in accordance with at least one embodiment disclosed herein.

FIG. 7 illustrates a method for securing the wireless environment 130. In at least one embodiment, the method 700 can include a process 710 for receiving an analog fiber optic signal that preserves native radio frequency (RF) energy characteristics of at least one first RF signal associated with at least one of the wireless devices 136A/136B/136C/136D/136E/136F. In at least one embodiment, process 710 can be performed via the fiber optic cable 120. Process 710 proceeds to process 720.

Process 720 can include converting the received analog fiber optic signal into at least one second RF signal. In at least one embodiment, process 720 can be performed by a light-to-RF converter, such as at least one of the first, second, and third local transceivers 351/352/353. Process 720 proceeds to process 730.

Process 730 includes analyzing the at least one second RF signal. In at least one embodiment, the process 730 is performed by the CPU 620 of the RF threat detector 112. Process 730 proceeds to process 740.

Process 740 includes generating at least one digital signature associated with the at least one wireless device, respectively, based on the analysis of the at least one second RF signal. In at least one embodiment, the process 740 is performed by the CPU 620 of the RF threat detector 112. Process 740 proceeds to process 750.

Process 750 includes determining if the at least one wireless device associated with the at least one digital signature, respectively, is one of an authorized device and an unauthorized device. In at least one embodiment, the process 750 is performed by the CPU 620 of the RF threat detector 112. In at least one embodiment, the method 700 can further include any of the processes and any of the components of the SMA 100 described above for FIG. 1.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An apparatus comprising:
   a receiver configured to receive an analog signal that preserves native radio frequency (RF) characteristics of a device RF signal received from a wireless device operating in a closed, fully RF-shielded environment;
   an analog RF signature engine configured to generate an analog signature of the wireless device based on the native RF characteristics of the device RF signal;
   a digital traffic signature engine configured to generate a digital signature of the wireless device based on information of network packets received from the wireless device;
   a continuous correlation and analysis module configured to correlate the analog signature and the digital signature with characteristics of each known device of a plurality of known devices; and
   a processor configured to determine the wireless device is an unauthorized device based on correlating the analog signature and the digital signature with the characteristics of each known device, and selectively permit transmission of RF signals from authorized, authenticated, and approved devices operating within the closed, fully RF-shielded environment to receivers located outside the closed, fully RF-shielded environment, while mitigating unintended RF signal demodulation by receivers located outside the closed, fully RF-shielded environment.

2. The apparatus according to claim 1, wherein the processor determines the wireless device is an unauthorized device based on discrepancies between attributes of the analog signature and previously stored information of RF signals of the plurality of known devices.

3. The apparatus according to claim 1, wherein the processor identifies, based on the digital signature, at least one hidden signal of the wireless device attempting to transmit data outside the closed, fully RF-shielded environment.

4. The apparatus according to claim 1, wherein the processor determines the wireless device is an unauthorized device based on:
analyzing a RF spectrum from the closed, fully RF-shielded environment; and
ascertaining a suspect signature of the unauthorized device based on subtracting signatures of known authorized wireless devices from the RF spectrum.

5. The apparatus according to claim 1, wherein the analog RF signature engine generates the analog signature based on at least one selected from signal power level, signal waveform data, and signal timing data determined from the native RF characteristics.

6. The apparatus according to claim 1,
wherein the analog signature comprises a plurality of wireless device analog attributes,
wherein the digital signature comprises a plurality of wireless device digital attributes,
wherein the continuous correlation and analysis module correlates the analog signature and the digital signature by:
comparing the plurality of wireless device analog attributes with a plurality of known analog attributes, each of the plurality of known analog attributes corresponding to a known device of a plurality of known devices; and
comparing each wireless device digital attribute with a plurality of known digital attributes, each of the plurality of known digital attributes corresponding to the known device of the plurality of known devices,
wherein the processor ascertains a probability of a match between the wireless device and the known device based on the comparison of the analog attributes and the comparison of the digital attributes, and
wherein the processor determines the wireless device is an unauthorized device based on the probability of a match between the wireless device and the known device.

7. The apparatus according to claim 6, wherein the digital traffic signature engine analyzes network packet data from the wireless device and analyzes port-level traffic of the wireless device,
where a first digital attribute of the wireless device digital attributes is based on the analyzed network packet data,
where a second digital attribute of the wireless device digital attributes is based on the port-level traffic.

8. The apparatus according to claim 6, wherein the analog RF signature engine generates audio data of a digital audio recording of the device RF signal, where an analog attribute of the wireless device analog attributes is based on the digital audio recording.

9. The apparatus according to claim 6, wherein the analog RF signature engine generates wireless device waterfall data of the device RF signal, where an analog attribute of the wireless device analog attributes is based on the wireless device waterfall data.

10. The apparatus according to claim 6,
wherein the continuous correlation and analysis module continuously correlates the analog signature and the digital signature with characteristics of each known device of the plurality of known devices to calculate a degree of statistical correlation and a probability of a match between the wireless device RF signal and RF signals of each known device, and
wherein the processor determines the wireless device is an unauthorized device based on the degree of statistical correlation and a probability of a match between the wireless device RF signal and RF signals of each known device.

11. A method comprising:
receiving an analog signal that preserves native radio frequency (RF) characteristics of a device RF signal received from a wireless device operating in a closed, fully RF-shielded environment;
generating an analog signature of the wireless device based on the native RF characteristics of the device RF signal;
generating a digital signature of the wireless device based on information of network packets received from the wireless device;
correlating the analog signature and the digital signature with characteristics of each known device of a plurality of known devices;
determining the wireless device is an unauthorized device based on correlating the analog signature and the digital signature with the characteristics of each known device; and
selectively permitting transmission of RF signals from authorized, authenticated, and approved devices operating within the closed, fully RF-shielded environment to receivers located outside the closed, fully RF-shielded environment via an antenna mounted on an exterior of the closed, fully RF-shielded environment, while mitigating unintended RF signal demodulation by receivers located outside the closed, fully RF-shielded environment.

12. The method according to claim 11, wherein determining the wireless device is an unauthorized device comprises determining the wireless device is an unauthorized device based on discrepancies between attributes of the analog signature and previously stored information of RF signals of the plurality of known devices.

13. The method according to claim 11, further comprising identifying, based on the digital signature, at least one hidden signal of the wireless device attempting to transmit data outside the closed, fully RF-shielded environment.

14. The method according to claim 11, wherein determining the wireless device is an unauthorized device is further based on:
analyzing a RF spectrum from the closed, fully RF-shielded environment; and
ascertaining a suspect signature of the unauthorized device based on subtracting signatures of known authorized wireless devices from the RF spectrum.

15. The method according to claim 11,
wherein the analog signature comprises a plurality of wireless device analog attributes,
wherein the digital signature comprises a plurality of wireless device digital attributes,
wherein correlating comprises:
    comparing the plurality of wireless device analog attributes with a plurality of known analog attributes, each of the plurality of known analog attributes corresponding to a known device of a plurality of known devices; and
    comparing each wireless device digital attribute with a plurality of known digital attributes, each of the plurality of known digital attributes corresponding to the known device of the plurality of known devices,
wherein the method comprises ascertaining a probability of a match between the wireless device and the known device based on the comparison of the analog attributes and the comparison of the digital attributes, and
wherein determining the wireless device is an unauthorized device comprises determining the wireless device is an unauthorized device based on the probability of a match between the wireless device and the known device.

16. The method according to claim 15, further comprising:
    analyzing network packet data from the wireless device, where a first digital attribute of the wireless device digital attributes is based on the analyzed network packet data; and
    analyzing port-level traffic of the wireless device, where a second digital attribute of the wireless device digital attributes is based on the port-level traffic.

17. The method according to claim 15, further comprising generating audio data of a digital audio recording of the device RF signal, where an analog attribute of the wireless device analog attributes is based on the digital audio recording.

18. The method according to claim 15, further comprising generating wireless device waterfall data of the device RF signal, where an analog attribute of the wireless device analog attributes is based on the wireless device waterfall data.

19. The method according to claim 15, wherein determining the wireless device is an unauthorized device is further based on continuously correlating the analog signature and the digital signature with characteristics of each known device of the plurality of known devices to calculate a degree of statistical correlation and a probability of a match between the wireless device RF signal and RF signals of each known device.

20. A system comprising:
    a receiver configured to receive an analog signal that preserves native radio frequency (RF) characteristics of a device RF signal received from a wireless device operating in a closed, fully RF-shielded environment;
    an analog RF signature engine configured to generate an analog signature of the wireless device based on the native RF characteristics of the device RF signal;
    a digital traffic signature engine configured to generate a digital signature of the wireless device based on information of network packets received from the wireless device;
    a continuous correlation and analysis module configured to correlate the analog signature and the digital signature with characteristics of each known device of a plurality of known devices;
    a configuration of multiple-input, multiple-output (MIMO) antenna clusters that mitigate unintended RF signal demodulation by receivers located outside the closed, fully RF-shielded environment; and
    a processor configured to determine the wireless device is an unauthorized device based on correlating the analog signature and the digital signature with the characteristics of each known device, and selectively permit transmission of RF signals from authorized, authenticated, and approved devices operating within the closed, fully RF-shielded environment to receivers located outside the closed, fully RF-shielded environment.

* * * * *